United States Patent
Wilhelm et al.

[19]

[11] Patent Number: 6,126,910
[45] Date of Patent: Oct. 3, 2000

[54] METHOD FOR REMOVING ACID GASES FROM FLUE GAS

[76] Inventors: James H. Wilhelm, 2394 Charros Rd., Sandy, Utah 84092; Robert E. Moser, 102 Ponderosa Dr., Palo Alto, Calif. 95060; Frank B. Meserole, 8719 Ridgehill Dr., Austin, Tex. 78759

[21] Appl. No.: 09/170,963

[22] Filed: Oct. 13, 1998

Related U.S. Application Data

[60] Provisional application No. 60/061,831, Oct. 14, 1997.
[51] Int. Cl.⁷ .............................. B01D 53/40; B01D 53/50
[52] U.S. Cl. ................ 423/210; 423/240 R; 423/243.08; 423/243.09
[58] Field of Search ................................. 423/210, 240 R, 423/243.09, 243.08

[56] References Cited

U.S. PATENT DOCUMENTS

| | | | |
|---|---|---|---|
| 3,780,500 | 12/1973 | Clemens et al. | 55/73 |
| 3,969,482 | 7/1976 | Teller | 423/235 |
| 4,108,959 | 8/1978 | Tatani et al. | 423/240 |
| 4,411,875 | 10/1983 | Butler et al. | 423/242 |
| 4,834,959 | 5/1989 | Kent et al. | 423/242 |
| 4,865,828 | 9/1989 | Lerner | 423/244 |
| 5,266,285 | 11/1993 | Glancy et al. | 423/243.09 |

FOREIGN PATENT DOCUMENTS

| | | | |
|---|---|---|---|
| 28 08 364 A1 | 9/1979 | Germany | 423/240 R |
| 41 14 986 A1 | 11/1992 | Germany | 423/240 R |
| 58-55027 | 4/1983 | Japan | 423/243.09 |

OTHER PUBLICATIONS

Kohl et al. *Gas Purification* 4th Edition, Gulf Publishing Co., Houston TX USA, ISBN 0–87201–314–6, pp. 333–334, 1985.

*Primary Examiner*—Steven P. Griffin
*Assistant Examiner*—Timothy C Vanoy

[57] ABSTRACT

A method is provided for removing contaminants, such as sulfur trioxide, sulfur dioxide and hydrogen halides, out of a gas, such as an exhaust gas from a coal or oil fired burner, by injecting a bisulfite containing solution into the gas so that the bisulfite reacts with the sulfur trioxide and/or hydrogen halides in the gas to produce salts and sulfur dioxide, or by injecting a sulfite containing solution into the gas so that the sulfite reacts the sulfur dioxide in the gas to produce bisulfite and this bisulfite reacts with the sulfur trioxide and/or hydrogen halides to result in the formation of salts and sulfur dioxide. The sulfur dioxide in the gas can be washed out of the gas in a downstream wet scrubber. By removing the sulfur trioxide and/or hydrogen halides out of the gas, corrosion of the gas scrubbing apparatus can be reduced.

16 Claims, 2 Drawing Sheets

METHOD FOR REMOVING ACID GASES FROM FLUE GAS

CROSS REFERENCE TO RELATED APPLICATIONS

This application claims the benefit of U.S. Provisional Application No. 60/061,831, filed Oct. 14, 1997.

TECHNICAL FIELD

This invention generally relates to a method for removing acid gases such as hydrochloric acid and sulfuric acid from stack gases from coal or oil-fired boilers. The method is particularly useful because it discriminates between these acid gases and sulfur dioxide. The sulfur dioxide is not removed. Specifically, the invention relates to a method of injecting a soluble bisulfite salt such as sodium bisulfite into flue gas.

BACKGROUND OF THE INVENTION

Sulfuric acid mist is a significant problem downstream of a coal or oil-fired boiler. It often forms as a sub-micron mist when the hot flue gas is cooled to the sulfuric acid dew point by mixing with cooler air in the atmosphere or with an aqueous stream or spray in a scrubbing system. The production of sulfur trioxide ($SO_3$) and resulting sulfuric acid mist is proportional to the amount of sulfur in the coal or oil and is a particular problem if oxidation catalysts such as vanadium and nickel are present in the flue gas. The acid mist often condenses in cool corners of electrostatic precipitators, ducts or bag houses causing corrosion. It also forms when the hot gas stream is quenched by liquid or slurry spray at the inlet to a sulfur dioxide scrubber. In such scrubbing systems, most of the sulfuric acid mist normally passes through the scrubber without being removed. Sulfuric acid plumes are common downstream of the stack on many oil-fired boilers. These plumes result from the cooling of the hot stack gas in the cooler air in the atmosphere. The fine mist is a form of visible pollution and results in acid rain down-wind of the plant.

Hydrochloric acid and hydrofluoric acid are acid gases generated while firing coal. These acids are not so easily condensed as sulfuric acid, but are very soluble in aqueous solutions or in rain droplets. Many sulfur dioxide scrubbing systems are plagued with high concentrations of chlorides and/or fluorides that build up in scrubbing liquors due to their removal from the flue gas. The chlorides in the solutions reduce the reactivity of limestone in sulfur dioxide scrubbing systems. Chlorides and fluorides cause corrosion problems with sulfur dioxide removal equipment. They also contaminate by-products such as gypsum that are often produced from such sulfur dioxide removal processes. Removal of these acid gases upstream of the scrubbers would eliminate these corrosion and contamination problems and improve the reactivity of the limestone used to neutralize and precipitate the absorbed sulfur dioxide.

One method of removal of sulfuric ($H_2SO_4$ or $SO_3$ in gas form) hydrochloric (HCL), and hydrofluoric (HF) acids from stack gases is to inject lime or soda ash into the gas stream either in a duct or in a spray dryer. U.S. Pat. No. 4,865,828 dated Sep. 12, 1989—Removal of Acid Gases in Dry Scrubbing of Hot Gases, Lerner, Bernard J., relates to such a method. This patent describes basic solutions, such as sodium carbonate, that are used to remove acid gases from flue gases with the primary emphasis on sulfur dioxide ($SO_2$) removal. Other methods are similar to the Lerner patent in that solutions of alkaline salts are injected into flue gas streams to remove sulfur dioxide and other acid gases simultaneously. However, existing processes do not differentiate between the gases. Consequently, in cases where it is desirable technically or economically, to remove HCl, HF and $SO_3$ prior to sulfur dioxide scrubbers, or to remove only HCl, HF and $SO_3$, the existing processes offer no solution.

It is thus desired in the art to provide a method for removing acid gases such as sulfuric, hydrochloric and hydrofluoric acids from flue gas streams, and that such removal be separate from sulfur dioxide removal.

SUMMARY OF THE INVENTION

It is therefore an object of the present invention to provide a method for removing acid gases such as HCl, HF and $SO_3$ from flue gas without removing significant amounts of sulfur dioxide.

It is also an object of the invention to condition flyash with the resulting salts such that it is more readily removed from the flue gas by electrostatic precipitators.

A further object of the present invention is to enhance the removal of other metal salts such as mercuric chloride from the flue gas.

Yet another object of the invention is to minimize or eliminate the sulfuric acid plume that sometimes forms downwind of the stack from a coal or oil-fired boiler.

Another object of the invention is to reduce or eliminate chloride and fluoride contamination of FGD process liquors and of by-products from sulfur dioxide scrubbing systems.

Yet another object of the invention is to reduce corrosion of ducts, particulate control devices and sulfur dioxide removal equipment by removing HCl, HF and $SO_3$ from the flue gas.

These and other objects and advantages are obtained by injecting bisulfite solution into the flue gas stream thereby absorbing the acid gas desired and forming the salt of the acid gas. The injection may be achieved by spraying bisulfite solution into the flue gas duct or into a conventional spray dryer. In any case, the solution is prepared to give adequate surface area of the spray droplets for effective contact with the gas. The injection system is also designed to insure that the droplets dry before they impact walls of the duct or spray dryer, so that they do not stick. The resulting dry particles may then be removed from the gas stream by conventional particulate control devices such as electrostatic precipitators or bag houses.

BRIEF DESCRIPTION OF THE DRAWINGS

The preferred embodiments of the invention, illustrative of the best modes in which the applicants contemplated applying the principles of the invention, are set forth in the following description and are shown in the drawings and are distinctly pointed out and set forth in the appended claims.

DETAILED DESCRIPTION OF INVENTION

Figure 1:
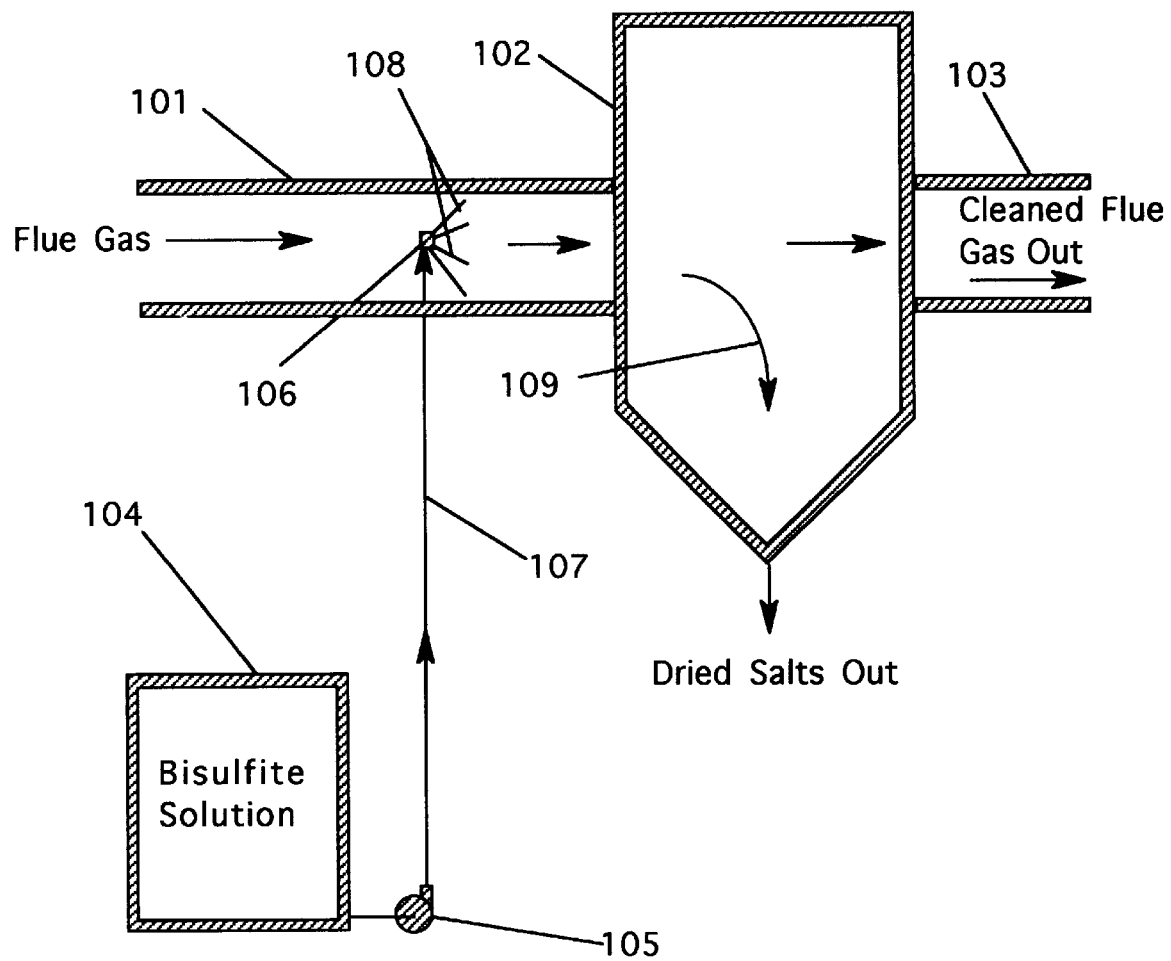
FIG. 1 is a diagram of one embodiment of the present invention.

In the first embodiment of the invention a solution of soluble bisulfite ions is sprayed into flue gas using conventional techniques to produce the droplet size required for complete evaporation of the water prior to the droplet coming into contact with equipment surfaces. This embodiment is depicted in FIG. 1. The concentration of the solution is set as required to neutralize the acids absorbed and to achieve complete evaporation of the liquor prior to contact with duct walls or equipment. The spray system is designed for efficient collection of the acid gas and for drying of the droplets using conventional in-duct spraying and spray drying principles.

The amount of reagent needed to remove a given amount of HCl, HF and $SO_3$ will be much less using sodium bisulfite solutions rather than other conventionally used solutions such as sodium carbonate and lime, because the other conventional reagents also remove sulfur dioxide, which is typically present in much higher concentrations than HCl, HF and $SO_3$. The method according to the present invention, therefore, has a much lower reagent consumption rate than other methods that do not differentiate between the acid gases HCl, HF and $SO_3$ and sulfur dioxide.

The chemical reactions of the present invention are summarized as follows:

$$NaHSO_3+HCl \rightarrow NaCl+H_2O+SO_2 \quad (1)$$

$$NaHSO_3+HF \rightarrow NaF+H_2O+SO_2 \quad (2)$$

$$2NaHSO_3+SO_3 \rightarrow Na_2SO_4+2SO_2+H_2O \quad (3)$$

$$NaHSO_3+SO_2 \rightarrow \text{No Reaction} \quad (4)$$

In some applications it will be possible to generate the sodium bisulfite required from sodium sulfite solution. Sodium sulfite solution is injected into the gas stream. The sulfite absorbs some sulfur dioxide and becomes sodium bisulfite according to the following reaction:

$$NaSO_3+H_2O+SO_2 \rightarrow 2NaHSO_3 \quad (5)$$

The resulting bisulfite then reacts to absorb the desired HCl, HF and $SO_3$ according to reactions (1), (2), and (3) above. The requirement for satisfactory utilization of the sodium sulfite is satisfied by having sufficient droplet drying time for the reactions to come to completion prior to the droplets impacting equipment surfaces and prior to complete drying of the droplets.

The cation associated with the bisulfite or with mixtures of sulfite and bisulfite does not generally enter into the reactions. Therefore, the bisulfite solutions used may be selected from a large group of soluble salts including sodium, potassium, ammonium, calcium or magnesium bisulfite. The use of bisulfite- and sulfite-based sorbents has the distinct advantage over conventional sorbents (such as lime, soda ash or trona) of being able to selectively remove acid gases without removing sulfur dioxide.

The bisulfite absorbs acid gases, which then become a dried salt such as sodium chloride or sodium sulfate, which may then be removed from the gas stream in a particulate control device such as a bag house or electrostatic precipitator. While sulfur dioxide may be temporarily absorbed into the droplet, it cannot remain in the liquid phase due to its high vapor pressure in the acidic bisulfite droplet, and as the droplet dries in the gas stream, any absorbed sulfur dioxide is released back into the gas stream. The method is particularly useful in reducing or eliminating sulfuric acid mist formation from the cooling of the hot stack gas, thereby eliminating downstream corrosion and/or the sulfuric acid plume that often forms in the atmosphere downstream of the stack. It is also useful in removing chlorides, fluorides and sulfates from the gas stream so that they do not contaminate sulfur dioxide scrubbing liquors downstream.

In some cases the strength of the solutions required for injection will be relatively dilute in order to form a large number of very small droplets for improved efficiency of contact with the gas. In such cases the resulting dried particles formed will be very small (less than 5 microns). One method of promoting the formation of larger particles in the process is to add suspended solids to the solution being injected into the flue gas. If solids such as calcium sulfite, flyash, limestone, gypsum, diatomaceous earth, or other solids that do not interfere with the desired chemical reactions, are injected into the gas stream with the bisulfite solution, they form nuclei on which the drying solids may precipitate. The larger particles formed thereby may then be removed more easily from the gas stream.

One example of the invention is the reduction of $SO_3$ content of stack gas to help reduce the plume problem associated with the formation of sulfuric acid mist formed in the quench zone of wet $SO_2$ scrubber systems. The particle size of sulfuric acid mist formed in this manner is generally in the sub-micron range and, thereby, efficiently passes through most scrubber processes without being absorbed. Sulfuric acid mist can also form in plumes from power plants that are not equipped with $SO_2$ scrubbers if the $SO_3$ levels are high enough. This situation can occur in oil-fired boilers where the ash contains high levels of vanadium and nickel, which catalyze the oxidation of $SO_2$ to $SO_3$ in the gas phase. Injection of bisulfite solution into the gas eliminates or minimizes the $SO_3$ concentration and eliminates the sulfuric acid plume from such sites.

Another example of the application of the invention is for chloride removal from stack gas. During the combustion of coal, most of the chlorides in the coal are converted to HCl. The HCl in the flue gas is removed very efficiently by sulfur dioxide removal processes. The build-up of chloride in the solutions associated with wet sulfur dioxide scrubbing processes presents a problem relating to the materials of construction. Consequently, the removal of HCl from the flue gas upstream of wet sulfur dioxide removal will reduce the build-up of chlorides in the scrubber system, thus reducing the corrosion potential of the scrubbing solution and any entrained mist.

The removal of HCl upstream of the FGD system can be very beneficial for a number of other reasons. The presence of chlorides in FGD scrubbing liquor reduces limestone dissolution rates in limestone-based scrubbing systems, which effect is often counter-acted by lowering scrubber pH. Lower scrubbing pH is not desirable, because reduced scrubbing efficiency results. However, if lower limestone utilization is accepted at higher operating pH due to chloride in the liquor, scrubber scaling is often exacerbated. The result is higher cost for limestone and higher operating costs for scale removal from the scrubbers. Consequently, by removing HCl upstream of the FGD system, the $SO_2$ removal efficiency and economics of operating the FGD system are improved.

Many FGD systems installed in the last decade produce gypsum (calcium sulfate dihydrate) as a by-product. Specifications for by-product gypsum often require that chloride be washed from the solids. Since chloride is soluble in FGD liquors, the chloride must be purged from the system in some stream or else it will build up to unacceptably high concentrations. Since the chloride can't leave the system in the gypsum, it must be purged in a separate stream, which then results in a wastewater stream that must be treated or placed in a disposal pond. Both of these alternatives increase operating costs. Further, if scrubbing enhancement additives such as organic acids are used in the FGD process, they are wasted with the chloride in the purge stream, resulting in higher additive consumption rates. By removing the chlorides upstream of the FGD system, soluble additives can be recovered through the gypsum cake-washing system, thereby reducing additive consumption rates and improving scrubbing system economics.

Additional examples of the application of the invention are to remove flyash and volatile metals such as mercury. The injection of sodium bisulfite solutions reduces the mercury concentration in the flue gas by condensing and absorbing mercuric chloride into the drying droplets. Improved flyash removal in electrostatic precipitators is also achieved due to ash conditioning achieved when the dried sodium salts are incorporated into the flyash. The ash conditioning is due to improved surface resistivity of the ash particles that come into contact with the injected solution.

Figure 2:
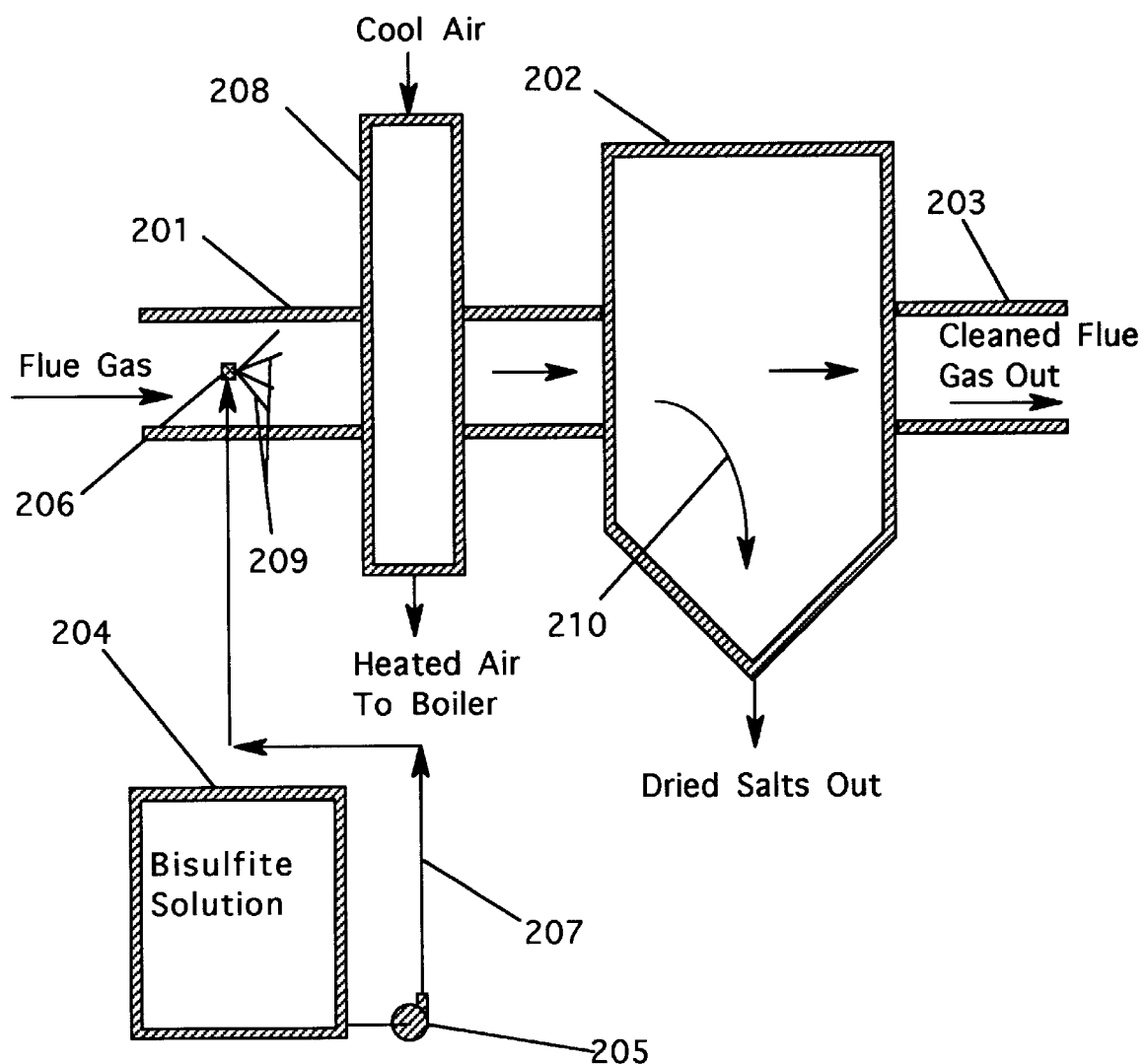
FIG. 2 is a diagram of an alternative embodiment of the present invention.

A potentially significant example of the application of the invention could be for improved heat rating of the boiler. For such an application an alternative location to introduce the sodium bisulfite solution is upstream of the air preheater section. Removal of $SO_3$ from the flue gas at this point would allow the air preheater outlet temperature to be lowered substantially below the typical range of values of 300–350° F. This would offer a method to increase the boiler efficiency, since lower temperatures could be achieved without the resulting corrosion from condensed sulfuric acid. FIG. 2 depicts this alternative embodiment of the present invention.

Having now described the theory behind the method, the apparatus is now described with reference to FIGS. 1 and 2. FIG. 1 depicts a flue gas duct 101 through which hot flue gas is flowing. A means 104 of containing bisulfite solution is provided, along with means of injecting the solution into said flue gas duct 101. In FIG. 1 the means of injecting the bisulfite solution is shown as a pump 105, a pipe 107, and a spray nozzle 106. The reagent injection scheme could include other means of injecting the bisulfite solutions, for example, the bisulfite solution could also be injected using hydraulic pressure of the bisulfite solution itself if the means of containment 104 were elevated above flue gas duct 101 such that sufficient hydraulic pressure were provided by the elevated solution.

Once the bisulfite solution in containment means 104 is injected into the flue gas, spray droplets 108 are formed. These droplets contact the flue gas and absorb one or more of the desired acid gases. The droplets 108 are then dried very rapidly by the heat of the flue gas before the droplets impact surfaces of flue gas duct 101. The dried salts 109 so formed are then collected in bag house 102, although other collection devices such as electrostatic precipitators may also be used. The cleaned gas then passes through the cleaned gas flue duct 103 usually to a sulfur dioxide scrubbing system or through a stack to atmosphere.

In some cases a particulate collection device is not used in application of the invention, because of the dilute concentration of particulates formed in flue gas duct 101. If this concentration of particulates is below regulatory limits, the salts may pass on through cleaned flue gas duct 103 to atmosphere without passing through bag house 102 or other dry solids collection device.

The alternative embodiment of the invention shown in FIG. 2 is used for removal of acid gases prior to an air preheater 208. The purpose of removing acid gas such as $SO_3$ at this point ahead of air preheater 208 is to keep from forming sulfuric acid mist in the air preheater 208 when the flue gas is cooled. More heat may be recovered from the hot flue gas using this embodiment of the present invention, thereby improving the efficiency of the boiler. In this embodiment flue gas flows in duct 201 where it is contacted by spray droplets 209. The spray droplets are formed by injecting bisulfite solution from containment means 204 through pump 205 and pipe 207 through spray nozzles 206. The spray droplets 209 absorb the desired acid gas such as $SO_3$, which then dries to form sodium sulfate in the hot flue gas. The hot gas then passes through the boiler air preheater 208 where it is cooled. The cooled flue gas containing the dried particulates 210 then passes to bag house 202 where the particulates 210 are removed. Cleaned flue gas then passes through duct 203, and generally on to a scrubbing system or to a stack to atmosphere.

We claim:

1. A method of removing an acid gas from a flue gas comprising the step of injecting a solution containing a bisulfite into a stream of the flue gas, said bisulfite reacting with the acid gas to form a reaction product, the sulfur dioxide in the flue gas being unreacted by said solution so as to remain in the stream of the flue gas immediately following removal of the acid gas.

2. The method according to claim 1 comprising the additional step of drying said reaction product in the flue gas stream thereby forming a dried reaction product.

3. The method according to claim 1 further comprising the additional step of wet scrubbing the flue gas to remove the sulfur dioxide after removal of the acid gas from the flue gas.

4. The method according to claim 1 wherein said solution further contains a sulfite.

5. The method according to claim 1 wherein said bisulfite is selected from a group consisting of sodium bisulfite, calcium bisulfite, magnesium bisulfite, potassium bisulfite, ammonium bisulfite and mixtures thereof.

6. The method according to claim 5 wherein said solution further contains a sulfite selected from a group consisting of sodium sulfite, calcium sulfite, magnesium sulfite, potassium sulfite, ammonium sulfite and mixtures thereof.

7. The method according to claim 1 wherein said solution contains suspended solid particles.

8. The method according to claim 1 further comprising the additional step of cooling the flue gas with a heat exchanger after removal of the acid gas from the flue gas.

9. A method of removing an acid gas from a flue gas comprising the step of injecting a solution containing a sulfite into a stream of the flue gas, said sulfite reacting with the sulfur dioxide to form a bisulfite, said bisulfite reacting with the acid gas to form a reaction product and to reform sulfur dioxide, so that sulfur dioxide remains in the stream of the flue gas immediately following removal of the acid gas.

10. The method according to claim 9 comprising the additional step of drying said reaction product in the flue gas stream thereby forming a dried reaction product.

11. The method according to claim 9 further comprising the additional step of wet scrubbing the flue gas to remove the sulfur dioxide after removal of the acid gas from the flue gas.

12. The method according to claim 9 wherein said solution further contains a bisulfite.

13. The method according to claim 9 wherein said sulfite is selected from a group consisting of sodium sulfite, calcium sulfite, magnesium sulfite, potassium sulfite, ammonium sulfite and mixtures thereof.

14. The method according to claim 13 wherein said solution further contains a bisulfite selected from a group consisting of sodium bisulfite, calcium bisulfite, magnesium bisulfite, potassium bisulfite, ammonium bisulfite, and mixtures thereof.

15. The method according to claim 9 wherein said solution contains suspended solid particles.

16. The method according to claim 9 further comprising the additional step of cooling the flue gas with a heat exchanger after removal of the acid gas from the flue gas.

* * * * *